(12) United States Patent  
Giuffre'

(10) Patent No.: US 8,267,115 B2  
(45) Date of Patent: Sep. 18, 2012

(54) SELF COMPENSATED, ADJUSTABLE FLUID EMITTER, PARTICULARLY IN IRRIGATION SYSTEMS

(75) Inventor: Carmelo Giuffre', Messina (IT)

(73) Assignee: Irritec SRL, Capo d'Orlando, Messina (IT)

( * ) Notice: Subject to any disclaimer, the term of this patent is extended or adjusted under 35 U.S.C. 154(b) by 867 days.

(21) Appl. No.: 12/374,677

(22) PCT Filed: Jun. 28, 2007

(86) PCT No.: PCT/EP2007/056520  
§ 371 (c)(1),  
(2), (4) Date: Mar. 5, 2009

(87) PCT Pub. No.: WO2008/006707  
PCT Pub. Date: Jan. 17, 2008

(65) Prior Publication Data  
US 2009/0320932 A1 Dec. 31, 2009

(30) Foreign Application Priority Data  
Jul. 10, 2006 (IT) ............... SV2006A0018

(51) Int. Cl.  
    *B05B 15/00* (2006.01)  
    *F16K 31/12* (2006.01)  
(52) U.S. Cl. .......... 137/504; 239/542  
(58) Field of Classification Search .......... 137/501, 137/504; 239/542, 547, 533.13, 533.14  
See application file for complete search history.

(56) References Cited

U.S. PATENT DOCUMENTS

| | | | | |
|---|---|---|---|---|
| 2,554,790 | A | * | 5/1951 | Miller ............... 239/533.13 |
| 2,953,168 | A | | 9/1960 | Vomacka |
| 3,777,980 | A | * | 12/1973 | Allport ............... 239/542 |
| 3,921,905 | A | * | 11/1975 | McElhoe et al. ...... 239/542 |
| 4,003,405 | A | | 1/1977 | Hayes et al. |
| 4,209,133 | A | * | 6/1980 | Mehoudar ............ 239/542 |
| 4,210,172 | A | | 7/1980 | Clements |
| 4,241,757 | A | | 12/1980 | Bron |

(Continued)

FOREIGN PATENT DOCUMENTS  
FR 1299719 7/1962

OTHER PUBLICATIONS

PCT, International Preliminary Report on Patentability, Jan. 13, 2009.

*Primary Examiner* — Eric Keasel  
(74) *Attorney, Agent, or Firm* — Themis Law (57) ABSTRACT

A self-compensated, adjustable fluid emitter includes a casing externally delimiting a volume, which is divided into a first chamber and into a second chamber by a fixed membrane that can be elastically deformed. An inlet communicates with the first chamber and an outlet communicating with the second chamber, causing the first and the second chambers to be in communication one with the other through a communicating duct. In operation, the membrane becomes deformed such that at least a portion thereof changes its position with respect to the outlet, modifying the flow rate of the fluid through the outlet depending on the pressure difference. Therefore, the flow rate of the fluid through the outlet is controlled and kept constant by the membrane in spite of changes in fluid pressure at least at the inlet or the outlet.

25 Claims, 8 Drawing Sheets

U.S. PATENT DOCUMENTS

| | | | | |
|---|---|---|---|---|
| 4,369,923 A | * | 1/1983 | Bron | 239/542 |
| 4,428,397 A | * | 1/1984 | Bron | 137/504 |
| 4,718,608 A | * | 1/1988 | Mehoudar | 239/542 |
| 4,796,660 A | * | 1/1989 | Bron | 137/504 |
| 5,101,854 A | * | 4/1992 | Bron | 137/501 |
| 5,279,462 A | * | 1/1994 | Mehoudar | 239/542 |
| 5,295,506 A | * | 3/1994 | Smith | 239/542 |
| 5,443,212 A | * | 8/1995 | Dinur | 239/542 |
| 5,636,797 A | * | 6/1997 | Cohen | 239/542 |
| 5,711,482 A | * | 1/1998 | Yu | 239/542 |

\* cited by examiner

SELF COMPENSATED, ADJUSTABLE FLUID EMITTER, PARTICULARLY IN IRRIGATION SYSTEMS

FIELD

The present invention relates to a self compensated, adjustable fluid emitter, particularly intended to be used in irrigation systems, which emitter comprises:

a casing externally delimiting a volume which is divided into a first chamber and into a second chamber by a membrane that can be elastically deformed;

an inlet that can be connected to a fluid supplying source and communicating with said first chamber;

an outlet communicating with said second chamber;

said first and said second chamber being in communication one with the other by means of at least a communicating duct; and means for retaining in a fixed position said membrane dividing the first chamber from the second chamber and allowing said membrane to be elastically deformed when said membrane is subjected to a fluid pressure difference between said first chamber and said second chamber, said membrane being deformed such that at least a portion thereof changes its position with respect to said outlet, modifying the flow rate of the fluid through said outlet depending on the pressure difference and, accordingly, on the deformation of the membrane that moves closer and/or farther away from the outlet, so the flow rate of the fluid through said outlet is controlled and kept constant by said membrane despite variations in the fluid pressure at least at the inlet or outlet.

More particularly, the flow rate or the flow amount through said outlet is reduced when the membrane is deformed moving closer to the outlet, while the flow rate of the fluid increases when the membrane is deformed moving farther away from said outlet. Therefore, the flow rate of the fluid through said outlet is controlled and kept constant by means of said membrane despite fluid pressure variations at least at the inlet or outlet.

BACKGROUND

Fluid emitting devices, particularly for irrigation systems are known. For example U.S. Pat. No. 4,428,397 describes a device of this type.

However, the above mentioned devices have some drawbacks. The adjustment of the flow rate in relation to the pressure difference between the two chambers divided by the membrane is solely obtained by means of structural and elasticity properties of the membrane. Therefore, the membrane is the only functional member determining the adjustment for a very large range of pressure differences.

Besides a saturation effect, i.e. a non-response effect when the fluid pressure difference in the two chambers divided by the membrane is over a certain maximum limit value and when it is lower than a certain minimum value, the continuous elastic stress of the material composing the membrane can cause the ageing of the material with regard to elastic characteristics and it may not be possible to adjust pressure difference values close to extreme values of the pressure difference range, within which the elastic behavior of the membrane would guarantee the flow rate to be adjusted. For example, when the membrane has to operate for a long time under high pressure difference conditions, the material can be inelastically deformed or stretched and so the elastic recovery to the original configuration cannot occur, rendering impossible the adjustment upon a low pressure difference.

Moreover, in order to guarantee a lasting and optimal elastic behavior, the membrane has to be composed of a material with high elastic qualities and so quite expensive. This has a considerable effect as regards total costs of irrigation systems having a large number of said emitters.

In FR 1.299.719, a flow regulating device is disclosed that includes two chambers separated by a membrane. One of the two chambers communicates with an inlet duct for a pressure fluid and the other one communicates with a duct delivering said pressure fluid, with the fluid passing from a chamber to the other one via a through aperture provided in said membrane. An outlet spout cooperates with the membrane for defining a predetermined pressure in the corresponding chamber of the device that communicates with the delivering duct, which outlet spout can be adjusted with reference to its relative position with respect to the membrane.

In such device, the distance between the membrane and the outlet spout acts for allowing a pressure to be adjusted on the corresponding side of the membrane, but it does not allow a range of the flow rate to be adjusted. Moreover the membrane has to be perforated thus making it highly sensitive to wear and so it is subjected to breaking or to functionality loss.

In all known devices, the flow rate is adjusted by limiting and controlling the pressure. After all known devices do not act independently of the flow rate and pressure. The two magnitudes can be really correlated one with the other. However there is the need of independently adjusting the two magnitudes, at least as regards a certain range of pressures and/or flow rates.

SUMMARY

The field of use to which the invention refers is the filed of drop emitters. In this field, it is advantageous to have available emitters that can change the flow rate of delivered irrigation water as a function of the seeding, growing, and harvesting cycles. It is advantageous to change the delivery of nutritious substances by increasing or decreasing them in the different evolution stages of these cycles according to needs and requirements of plants when the plants are growing and developing. All this, without shocking or abusing plants and saving tools and workforce when replacing emitters.

The invention aims at providing an emitter of the type described hereinbefore, wherein, by means of simple and inexpensive arrangements, the above described drawbacks of known emitters regarding the automatic control of the flow rate under different fluid supplying conditions may be overcome.

The invention achieves the above aims by providing a self compensated adjustable emitter, particularly intended for use in irrigation systems, which emitter includes the above described features, and wherein means for changing the position of the membrane with respect to the outlet, i.e. for mechanically and firmly changing the distance of said membrane from the outlet and/or means for mechanically and firmly changing the elastic behavior of the membrane and/or for generating a firm deformation of said membrane are further provided.

According to an advantageous embodiment, said means are provided in combination with means for reducing the pressure acting simultaneously and independently of the compensating membrane.

Said means for mechanically and firmly changing the elastic behavior of the membrane and/or for generating a firm deformation of the membrane can be operated already in the idle condition thereof, i.e. when there is no fluid pressure difference in the two chambers divided by said membrane.

These means can be also operated when the membrane is in its operating condition and i.e. when there is a fluid pressure difference in the two chambers divided by said membrane.

Means for changing the position of the membrane with respect to the outlet can also be operated when the membrane is not urged and/or deformed, i.e. in its idle condition, or when there is no fluid pressure difference in the two chambers divided by said membrane.

According to the first embodiment, the membrane is supported by an intermediate flange of the inner space of the casing between two opposite walls, one of which has the fluid inlet port and the other one of which has the outlet port, said two opposite walls being each one a part of a cup-like half-shell, and the two cup-like half-shells being tightly coupled together and being movable so that they can move closer and/or farther away one with respect to the other, including said opposite walls, while only one of the two half-shells, particularly the half-shell having the wall wherein the inlet port is provided, bears the flange fastening the membrane.

A preferred embodiment provides the casing to have a substantially cylindrical shape, the two half-shells being made of two opposing cup-like members and the two opposite walls having the inlet port and the outlet port respectively composed of top and bottom walls of the cylindrical casing, while the membrane is supported by an inner perimetric annular flange provided in the cup-like member, whose wall has the inlet port said flange being arranged parallel to said wall bearing the inlet port.

A variant embodiment provides the casing to be made of a cup-like member and of a wall closing the open side of said cup-like member to be slidably mounted inside said cup-like member, moving closer and farther away from an opposite bottom wall of said cup-like member.

In particular, the wall closing the cup-like member is composed of the surface of a closing cylinder having a certain axial extension.

Even in this case the cup-like member bears the membrane, while the closing wall can be moved with respect to said membrane.

The cup-like member has a cylindrical shape and the bottom side thereof is circular and bears the inlet port, the closing wall being also composed of a circular shaped wall that is substantially parallel to the bottom wall of the cup-like member and to the flange supporting the membrane as well as to the membrane in its non-deformed configuration.

In all above mentioned variants, ducts or passageways for the fluid from the first chamber provided on the side of the membrane faced toward the inlet port to the second chamber provided on the side of the membrane faced toward the outlet port are provided in the flange supporting the membrane and/or in the shell perimetric wall of one or both the cuplike members.

Moreover, that ducts and/or passageways have sections that not change in relation to fluid supplying and/or delivering conditions.

A second alternative provides the membrane to be supported by means having a predetermined fixed position with respect to the outlet port, while spring means are provided that can be loaded in an adjustable way in order to obtain a variable deformation of the membrane already when there is no pressure difference in the two chambers divided by it.

Particularly, an embodiment provides the membrane to be retained by a perimetric flange provided at an intermediate position between two opposite walls delimiting the casing, one of which wall bears the inlet port and the other one bears the outlet port, while on the membrane side faced towards the wall bearing the outlet port there is provided a spring member interposed between said side of said membrane and a fixed abutment member, there being provided means for mechanically deforming said spring means and for elastically loading them.

An embodiment provides said spring loading means to be composed of means compressing the spring member between said side of the membrane and said abutment member.

Particularly, the abutment wall or the abutment member can be moved and constitute means compressing the spring member.

The preferred embodiment provides the abutment wall of said spring means interposed between said abutment wall and the membrane to be composed of the wall of the casing wherein the inlet port is provided, which wall can be tightly moved closer and farther away from the membrane, while the membrane is supported by means having a fixed position with respect to the outlet port.

The casing may be manufactured similarly to the casing previously described with reference to the first alternative.

When the casing is made of two opposing cup-like members that can be tightly engaged and can be moved closer or farther away one with respect to the other, so the bottom side of one of the two cup-like member is the wall bearing the inlet port and acting as a abutment part that can be moved loading the spring member, the second cup-like member has a bottom side with the outlet port and an inner perimetric flange supporting or fastening the perimetric edges of the membrane, which flange has a fixed position with respect to the bottom wall bearing the outlet port. A spring member is provided between the bottom wall of the cup-like member bearing the inlet port and the membrane when the two opposing cup-like members are tightly mounted.

A variant embodiment provides only a cup-like member, whose bottom wall has the inlet port and a wall closing the cup-like member has an annular perimetric flange supporting the peripheral edges of the membrane, which flange is provided at a certain distance from the inner side of the closing wall.

As already described in the previous embodiment with reference to the first alternative, also in this case the casing may have cylindrically shaped cup-like members constructed as a cylindrical half-shell and end walls of the cylindrical casing, which are provided one with the inlet port and the other one with an outlet port, while the membrane is borne by an inner, annular peripheral flange that is integral with the cup-like member or the closing wall may bear the outlet port.

Advantageously, the spring member is composed of a coil spring.

The membrane is supported along an annular perimetric band that is continuous or discontinuous or provided with passageways for the fluid or passage ducts for the fluid, while it freely extends for the remaining part of the surface thereof, the membrane being al least rested on supporting abutment parts and particularly on an annular perimetric flange on the side thereof opposite to the chamber communicating with the fluid outlet port.

As regards means for reducing the pressure, said means are integrated in the emitter and may consist of a labyrinth or a duct having an intricate path.

Advantageously, said labyrinth or intricate path duct is interposed between the inlet and the outlet of the communication duct connecting the two chambers separated by the membrane or said labyrinth or intricate duct may form at least partially the communication duct between said two chambers.

With reference to embodiments wherein the casing is composed of two parts tightly slidably connected according to a direction perpendicular to the membrane, and wherein a part has a shell wall tightly overlapping the shell wall of the other part, the intricate duct or labyrinth are provided along a perimetric band of one of said two overlapped and slidable perimetric walls and is formed of a perimetric groove extending for an angle size smaller than 360° or is like an annular groove or helicoidal groove extending along various coils, while one of the end of said annular groove leads to a chamber and the other end leads into the other chamber of the two chambers separated by the membrane.

Said duct can be provided in combination with any one of the above arrangements for the casing, and particularly it can be made like an annular or helicoidal perimetric groove provided on the outer side of the perimetric wall of one of the two half-shells or of the cylindrical member slidably and tightly entering inside the perimetric wall of the other half-shell member of the two half-shells or of the two parts composing the casing according to one or more of the embodiments described above.

According to another embodiment of the emitter according to the present invention, instead of an elastic member deforming the membrane on the side thereof faced towards the inlet, there are provided rigid members deforming the membrane which are provided at a predetermined distance from the membrane, and in such a position of the membrane intermediate between the two chambers, causing the membrane to merely rest against said deforming means without being deformed by them, while in a position moved towards the chamber where the inlet leads, i.e. a position reducing the size of said chamber, the membrane is deformed by the rigid deforming means toward the chamber wherein the outlet leads, and in a modified position that increases the volume of the chamber wherein the inlet leads when the membrane is moved away from said rigid deforming means. Said rigid deforming means are composed of a spout extending the inlet towards the membrane and projecting at a predetermined extent toward the membrane, which has an inner supply duct leading at the end side of the extending spout and intended to contact the membrane, and which further has a radial or side port for supplying the fluid in the peripheral wall.

By means of the features of the present invention, it is possible to pre-set a certain distance of the membrane from the outlet port both by bringing closer or farther away the outlet port from the membrane that is in its idle condition, i.e. without fluid pressure differences in the two chambers divided by the membrane or without a deformation, and causing a deformation of the membrane by elastically and mechanically pre-loading the membrane, leading to a greater or lower deformation when there is no pressure difference between the two chambers divided by the membrane. That allows calibrating emitters such that they can always operate in a restricted adjustment range as regards the adjustment caused only by the elastic deformation of the membrane due only to the intrinsic elasticity characteristics thereof. That allows having emitters with a longer lasting automatic adjustment of the flow rate, but also using less noble and less expensive materials for membranes without compromising the system functionalities while drastically decreasing manufacturing costs.

By means of the above features, the emitter according to the present invention allows the flow rate of the delivered fluid to be adjusted and the pressure to be adjusted. Both functions are independent one from the other. Moreover, the fact of adjusting the flow rate and the pressure allows self compensating functions for the delivered flow rate to be provided in different ranges of the flow rate or for different values of the flow rate that are pre-set by moving and/or preloading the membrane.

Figure 11:
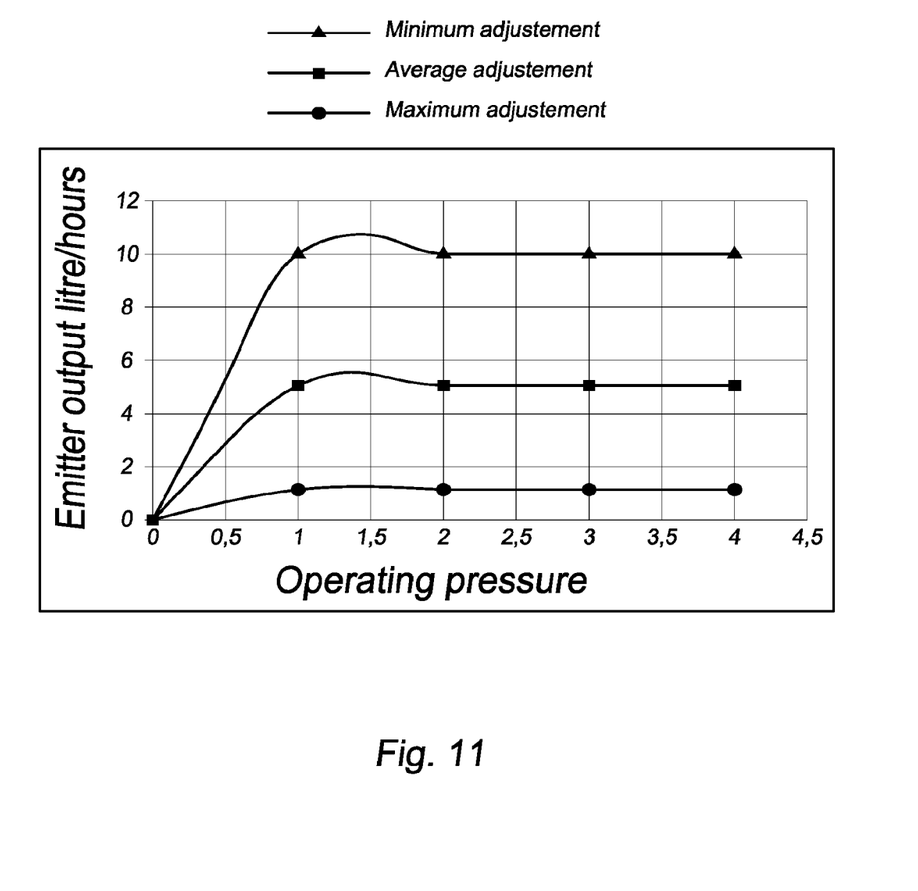
FIG. 11 is a diagram of the emitter behavior according to the present invention with reference to the change in the flow rate of the delivered fluid as a function of the fluid pressure and for three different values of the flow rate set in the emitter.
Figure 12:
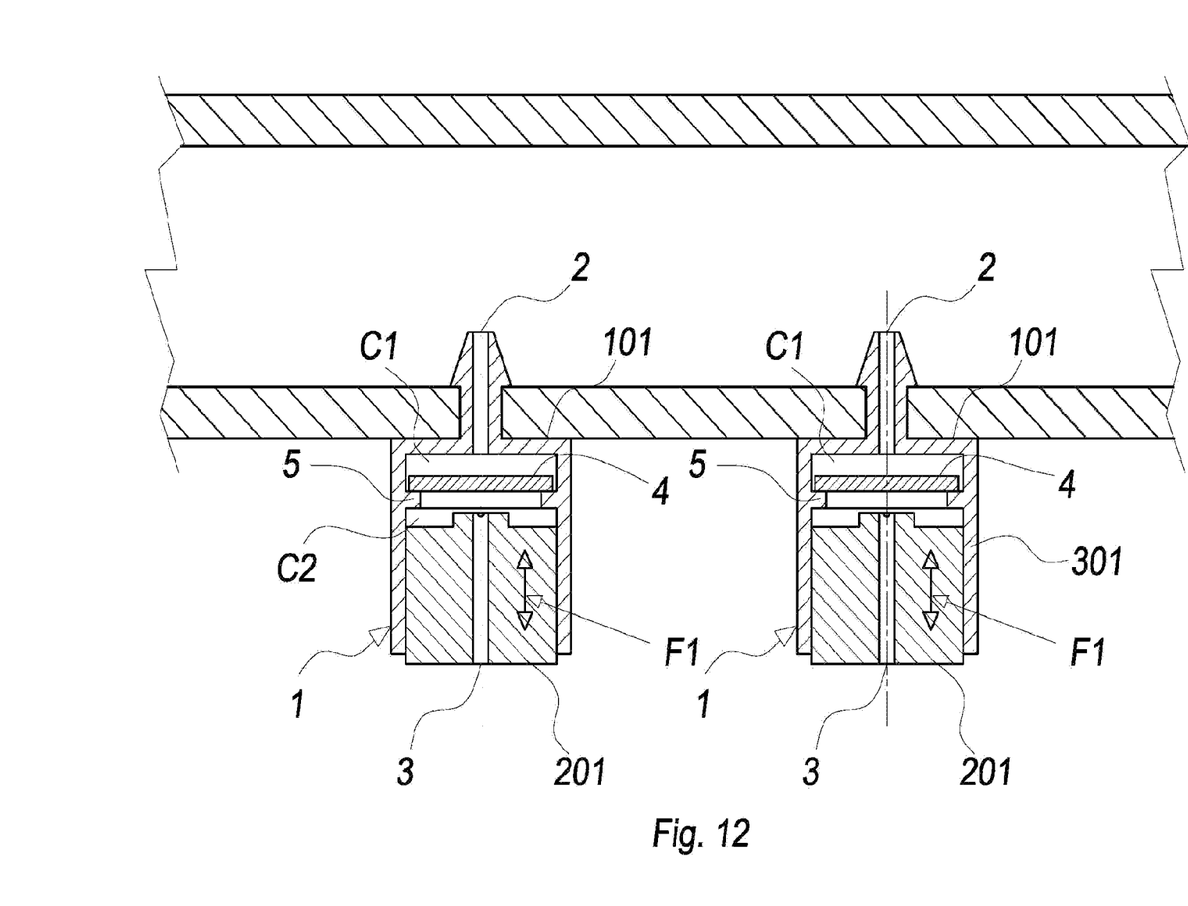
FIG. 12 illustrates a supply duct, to which a plurality of emitters are connected.

The diagram of FIG. 11 shows the trend of the flow rate as a function of the pressure for three different emitter adjustments. In this case, it can be noted that for three different values of the flow rate, the emitter performs a self compensation as the pressure increases, while keeping the flow rate constant at the predetermined value.

Therefore, by acting on the relative position of the two half-shells and so on the distance between the membrane and the mouth of the outlet duct, it is possible to set a value of the flow rate that is kept independently of the change in the pressure value in a particularly high range, and in the example of FIG. 11 such value is from 1 to 4 atmospheres.

BRIEF DESCRIPTION OF THE DRAWINGS

Features of the invention and advantages deriving therefrom will be clearer from the following description of some embodiments shown as not limitative example in annexed drawings.

DETAILED DESCRIPTION

Figure 1:
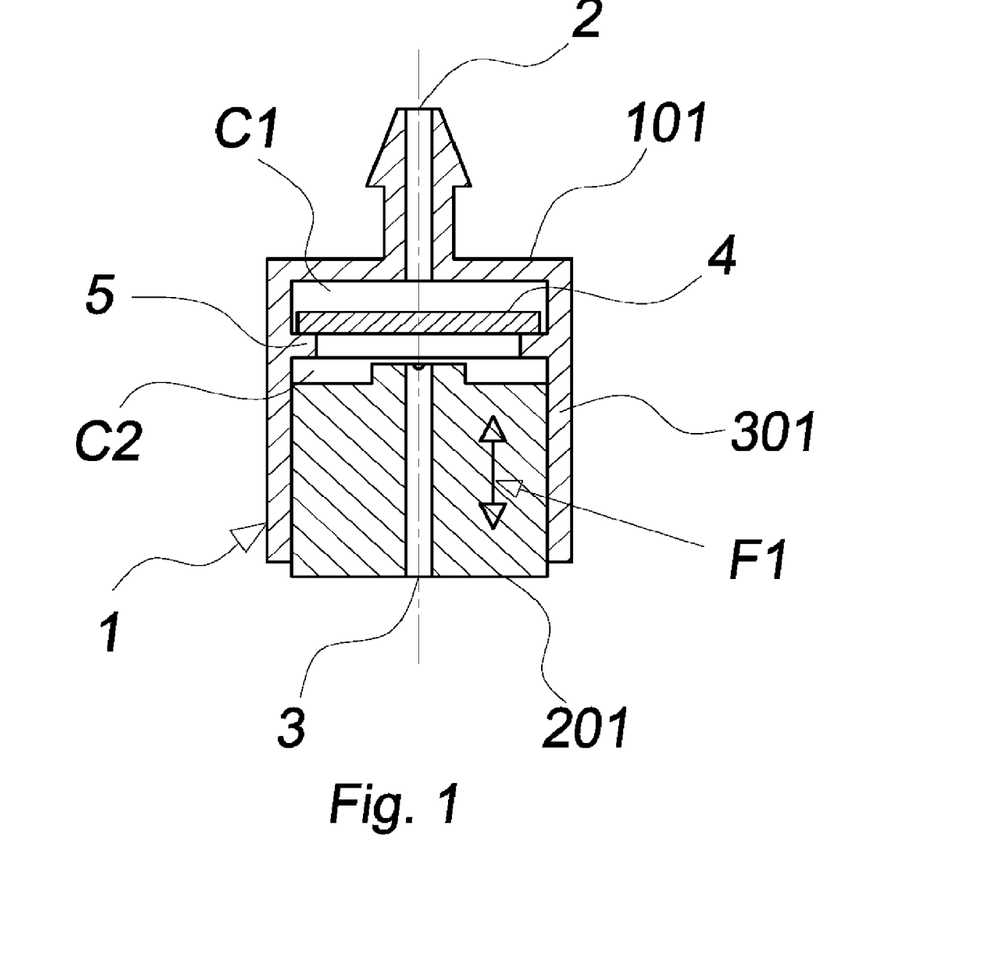
FIG. 1 is a first embodiment of the present invention, wherein the preventive adjustment of the operating range of the adjusting membrane is obtained by modifying the distance of the adjusting membrane in its idle condition from the outlet port, i.e. without pressure differences on the two sides of the membrane or under the not-deformed condition of the membrane.

With reference to FIG. 1, there is shown a fluid emitter, particularly an irrigation dripping device that includes a casing 1, inside which there is defined a space for storing the fluid to be delivered; an inlet mouth 2 intended to be connected to a fluid source; and an outlet, particularly an outlet duct 3 for delivering the fluid drop by drop. In the shown embodiment, the duct composed of the inlet port and the outlet duct are coaxially arranged, and each of them is provided at one of two opposite upper or lower end walls 101 and 201 of the emitter casing 1.

The inner delimited space of the casing 1 is divided in two chambers C1 and C2 by a membrane 4 supported in an intermediate position between the two walls 101 and 201 by an inner peripheral flange 5 extending along the inner side of the shell wall 301 of the casing 1.

The membrane 4 is made of an elastic material and tightly divides the two chambers C1 and C2, which are in communication by means of one or more ducts and/or one or more passageways made in the flange 4 and/or inside the thickness of the shell walls 301 of the casing 1 (not shown in the annexed figures but known in the prior art).

Therefore, as it results from the figure and from the previous disclosure, the membrane 4 is a barrier that can be elastically deformed with the fluid freely flowing between the two chambers and from the inlet mouth 2 to the outlet duct 3. The membrane 4 is supported and held only along a band of the peripheral edge, while the remaining inner portion of its extension is free to be deformed, since it extends like a bridge on the open central region of the peripheral annular flange 5.

Ducts and passageways between the chamber C1 and the chamber C2, respectively on the side of the membrane faced towards the inlet port 2 and towards the outlet duct 3, are such that under certain pressure conditions of the fluid inside the chamber C1 and inside the chamber C2 two different pressures are generated. In particular, when the inlet fluid pressure is very high, such that it is not possible to have the dripping action or the amount of the delivered fluid exceed the desired amount, a pressure difference between the fluid in the chamber C1 and the fluid in the chamber C2 is generated in favor of the pressure inside the chamber C1. As shown in following figures, the higher pressure in the chamber C1 causes the membrane to be elastically deformed bending into the chamber C2 towards the wall bearing the outlet duct 3. In this case, the membrane moves closer the entrance of the outlet duct 3 in the chamber C2 and causes a reduction of the flow rate that depends on the higher pressure inside the chamber C1, achieving an automatic adjustment of the flow rate within desired ranges of the flow rate for delivering the fluid by dripping action.

Therefore, the fact that the outlet duct 3 and the inlet mouth 2 are coaxially arranged is particularly advantageous since it maximizes and centers the deforming action with the position of the outlet duct 3. Moreover, the rotational geometry is concentric with the axes of the two ducts, of the membrane 4 and of the flange 5, optimizing the desired effect, this design cannot be considered as limitative. This is also true if the casing is manufactured with a cylindrical shape with the two walls 101 and 201 composed of the end walls of the cylindrical casing 1, the shell wall 301 composed of the cylindrical shell wall 301, the flange 5 extending in a plane parallel to the two end walls 101 and 201, therefore as the membrane 4, and with the inlet mouth 2 and the outlet duct 3 that are coaxial with respect to the end walls 101 and 201 and to the axis of the cylindrical casing.

The inner surface of the wall 201 delimiting the chamber C2 on the side of the membrane faced towards the outlet duct 3 advantageously has a shape that is not flat and has an axial annular projection 401 about the outlet duct 3, extending it towards the membrane 4. This annular, axial projection 401 can be advantageously provided with one or more radial grooves constituting a passageway for the fluid when the membrane is deformed to the greatest extent. In fact, if the fluid supplying pressure in the chamber C1 increases too much, the membrane could be deformed such that the entrance of the outlet duct 2 in the wall 201 can be completely closed, causing the delivering flow to be stopped and so the irrigation fluid to be not present with the danger of damaging the crops. By providing the annular, axial projection 401 with radial grooves or through apertures (not shown in the figures), the membrane cannot completely prevent the output flow even when it completely adheres against the most projecting surface of the axial projection 401 constituting the entrance of the outlet duct 3. For example, in this case the radial grooves would be closed only at the open side and the fluid would be able to pass from the chamber C2 towards the outlet duct 3 through them with a minimum flow rate guaranteed even in the case of fluid supplying pressures overcoming a maximum limit within, which the membrane can automatically and progressively (i.e. depending on the supplying fluid pressure) adjust the flow rate.

Figure 2:
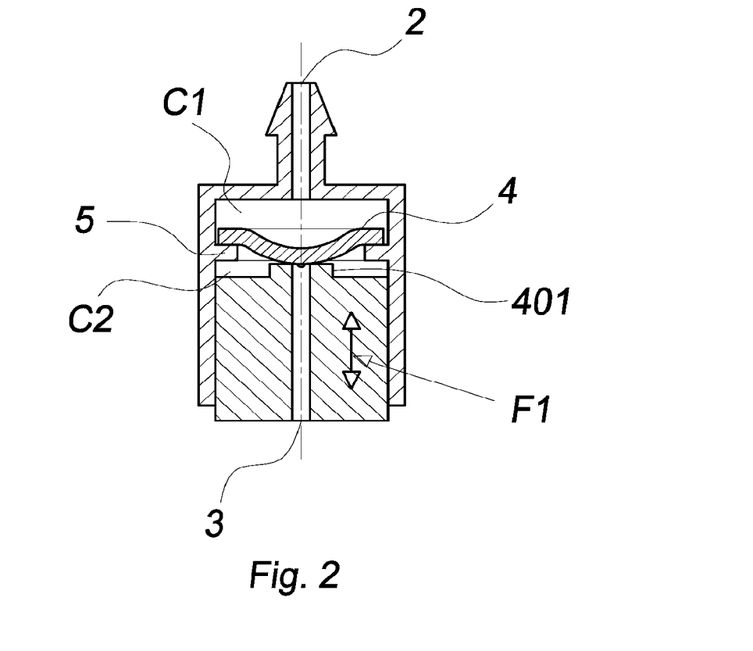
FIGS. 2 and 3 are the embodiment of FIG. 1, but with the distance of the membrane from the outlet of the emitter set in two different ways and with the membrane deformed by a pressure difference.
Figure 3:
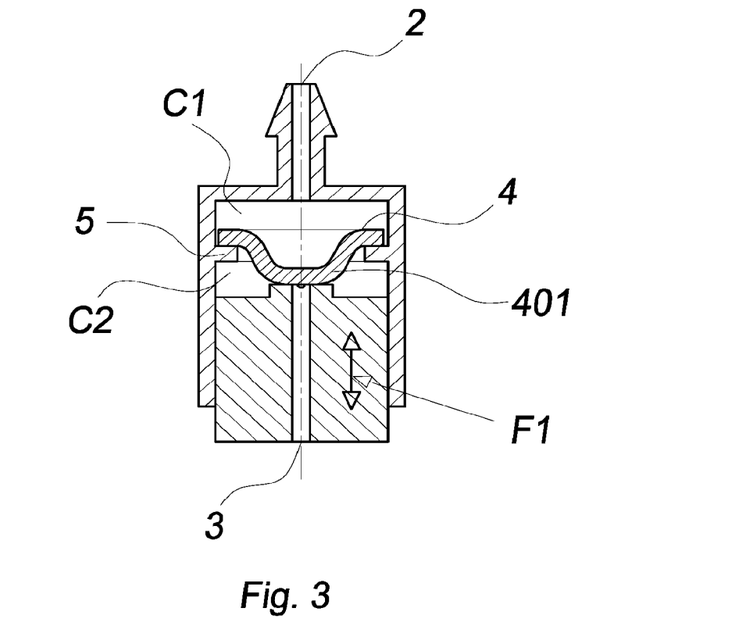

According to a first embodiment shown in FIGS. 1 to 3, the flow rate of the delivering flow depends on the pressure of the fluid supplied to the dripping unit and is adjusted not only automatically solely by means of the intrinsic elasticity of the membrane 4, but also by a manual mechanical action presetting a certain operating condition of the membrane and adapting it to changing conditions of the delivering pressure that are present in the system or in the fluid supplying source to which the emitter is connected or has to be connected.

As shown in FIGS. 1 to 3, this is achieved through the distance between the mouth of the outlet duct 2, i.e. the inner surface of the wall delimiting the chamber C2 about the outlet duct 3, and in the present example, the end surface of the axial projection 401 and the faced surface of the membrane 4 cooperate with the mouth of the outlet duct 3, i.e. with said surfaces, making such distance adjustable and pre-set, in order to reduce the passage opening according to the pressure difference between the two chambers C1 and C2, so to modify the flow rate.

In the embodiment of FIGS. 1 to 3, the position of the wall 201, in which the outlet duct 3 is provided, is modified with respect to the membrane 4, i.e. to the flange 5 fastening it.

Different specific arrangements are possible. The wall 201, in which the outlet duct is provided, can be made to be tightly mounted and moved, as well as to be locked in place inside and along perimetric or shell walls 401 of a cup-like member that is integrally formed by the end wall 101 bearing the inlet port 2, by the shell or perimetric wall 301 with the inner flange 5 fastening the membrane 4. In the shown embodiment, this is achieved by providing the wall 201 wherein the outlet duct 2 is made as an axially elongated body that can be axially tightly moved inside the perimetric shell wall 301 in the direction coaxial to the outlet duct 2 and/or to the inlet duct 3 and/or in the direction perpendicular to the membrane 4. The coupling of the wall 201 or of the body 201 can be of any type and particularly the above mentioned cylindrical realization is advantageous since it allows a screw type coupling the body 201, making the movable wall composed of cylindrical member provided with an external thread, while the shell wall 301 has a corresponding inner thread in the axial portion between the flange 5 and the free end edge opposite to the wall 101. The tight effect can be guaranteed, for example, by one or more O-rings interposed between the external shell wall of the cylindrical body forming the movable wall 201 and the inner side of the shell wall 301 of the cup-like member.

Other structural variants are possible, for example the movable wall 201 bearing the outlet duct 3 can be also a part of a cup-like member opposing the cup-like member associated to the end wall 101 provided with the inlet duct 2. In this case, the outlet duct 3 can be made by a mouthpiece integral with the end wall 201 of the second cup-like member, while shell walls of the two cup-like members have such diameters that the inner diameter of the first cup-like member associated to the inlet mouthpiece 1 is greater or substantially equal to the outer diameter of the shell wall of the second cuplike member bearing the outlet mouthpiece. In substance, the body 201 of the FIG. 1 and of the following figures is not solid but it is made hollow like a cup for a certain axial length, while for the remaining axial length it would have the diameter reduced such to make the outlet mouthpiece.

The two cup-like members can be also substantially symmetrical one with respect to each other, the only differences being the annular axial projection of the outlet duct 3 on the second cup-like member and the presence of the inner flange 5 on the first cup-like member associated to the inlet mouthpiece 2.

The two variants have not to be intended as limitative, as well as references made to the rotational or cylindrical symmetry shape that are simpler from the a construction and description point of view, but they are not the only possible shapes, because the casing may be made with any shape and the fluid inlet and outlet ducts 2, 3 of the membrane 4 may have different orientations. The only essential feature is the distance between the entrance of the outlet duct 3 in the chamber C2 and the membrane surface faced toward it that can be varied and locked at the selected value. The arrow F1 in the figures generally denotes the possibility to move the wall 201 in order to achieve this functionality in examples of FIGS. 1 to 3.

Figure 5:
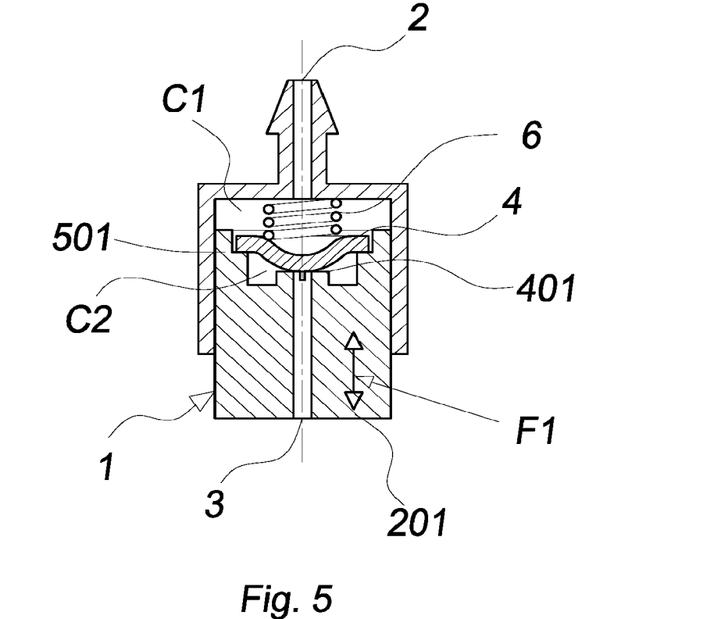
FIGS. 5 and 6 are two further operating adjusting conditions of the emitter according to FIG. 5, wherein the membrane is considerably deformed.
Figure 6:
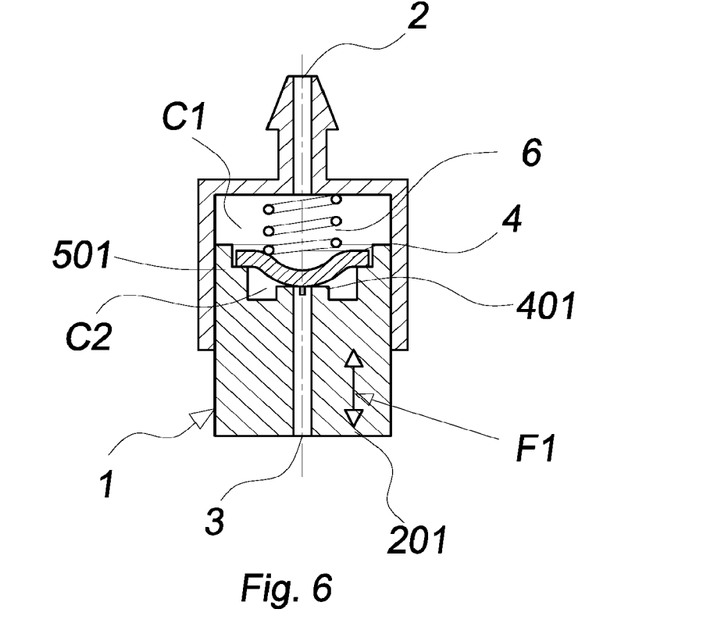

FIGS. 5 and 6 show a variant of the present invention, in which the initial distance is not adjusted, i.e. the distance of the membrane from the entrance of the outlet duct 3 when it is in its idle condition, or when there is no deformation or where there is no pressure difference in chambers C1 and C2 divided by the membrane, but an initial predetermined deformation of the membrane is given by mechanical and preferably spring means when there is no fluid pressure difference in the two chambers C1 and C2. In this case, the initial distance of the membrane 4 from the entrance of the outlet duct 3, i.e. the distance of said membrane from the entrance of the outlet duct 3 when there is no a substantial pressure difference between the fluid pressure in the two adjacent chambers C1 and C2 divided by the membrane 4, is modified by acting on the membrane moving closer and/or farther away from said entrance of the outlet duct 3 on the basis of a deformation caused by mechanical means, which is adjustable.

Different embodiments are possible providing a pressing member that is rigid or elastically pliable and that can be pushed with a different force against the membrane on the side thereof faced towards the chamber C1, wherein the fluid inlet duct comes out directly connected to the supplying source.

Means for adjusting said pressing force can be provided in different configurations, to be all considered within the reach of the person skilled in the art, and also in different constructional choices.

A preferred and advantageous embodiment that is shown in FIGS. 5 to 6 provides a construction similar to the one of the previous embodiment, but in this embodiment the wall 201 is made like a cup or at least with an end face faced towards the membrane that is made hollow like a cup, and the shell peripheral wall 501 forms a step-like enlargement supporting the outer peripheral band of the membrane. The step-like enlargement 601 is the same as the flange 5 in the previous embodiment, while like the embodiment of FIGS. 1 to 3, the end wall member 201 can be axially moved towards the inlet duct, i.e. towards the end wall 101 of the cup-like member delimiting the chamber C1 that is associated to the inlet mouth 2.

A spring member, for example a coil spring 6 is interposed between the wall 101 and the cup-like member, i.e. the end wall 101 associated to the inlet mouth 2 and the faced side of the membrane 4, that is, the side thereof faced towards the end wall 101 bearing the inlet mouth 2.

The member 201 can be moved with respect to the cup-like member according to one of the modes described with reference to the previous example, for example by tightly screwing and/or unscrewing it inside the shell wall 301 of the cup-like member delimiting the chamber C1, particularly when the pieces have a cylindrical shape or a rotational or cylindrical symmetry shape defined above in more details. In this case, it is to be noted that the membrane 4, that is the flange supporting it, is integrated in the body 201 and so it moves together with the surface of the extension axial projection 401 of the outlet duct 3, therefore the movement of the body 201 does not lead to a change of the distance between the mouth of the outlet duct 3 and the flange supporting the membrane as in the previous example, but causes only the membrane 4 to go closer or farther away from the end surface 101 bearing the inlet mouth 2, and so it causes the coil spring 6 to be pressed at a greater or lower extent determining a deformation of the membrane 4 that can change depending on the compression of the spring 6. Therefore, when there is no fluid pressure difference in the two chambers C1 and C2, it is possible to previously set a deformation of the membrane 4 corresponding to a different distance between it and the entrance of the outlet duct 3 and consequently a different flow rate.

Like in the previous example, the casing 11 can have also other configurations different from the shown configurations, that however involve some functional and constructional advantages such as, for example, the screw coupling between the member 201 and the shell perimetric wall 301 of the cup-like member, and also the fact that the membrane spring member inlet mouth 2 and outlet duct 3 are coaxial one with respect to the other, which is achieved by means of the cylindrical shape or of the cylindrical symmetry.

From the functional point of view, in both the variant embodiments it is possible to previously and manually or mechanically adjust the distance between the membrane and the entrance of the outlet duct when there is no pressure difference between the fluid pressure in the two chambers divided by the membrane, in order to define an operating point of the emitter corresponding to a predetermined flow rate where there is no such pressure difference. Therefore, that allows adapting the operating point of the emitter to average conditions of the supplying pressure such that it is not necessary always to act in extreme conditions of the possible adjusting range. In the first case, the idle distance of the membrane from the entrance of the outlet duct is changed by moving the entrance of the outlet duct from the membrane without changing the membrane configuration, i.e. without a deformation thereof or without the fluid pressure difference in the two chambers. On the contrary, in the second case in said condition without a pressure difference between the fluid pressure in one chamber C1 and the fluid pressure in the other chamber C2 the membrane is subjected to a deformation modifying the distance between it and the entrance of the outlet duct. In both cases, when there is no pressure difference between the fluid pressure in one chamber C1 and the fluid pressure in the other chamber C2 the flow rate of the emitter is modified.

Figure 4:
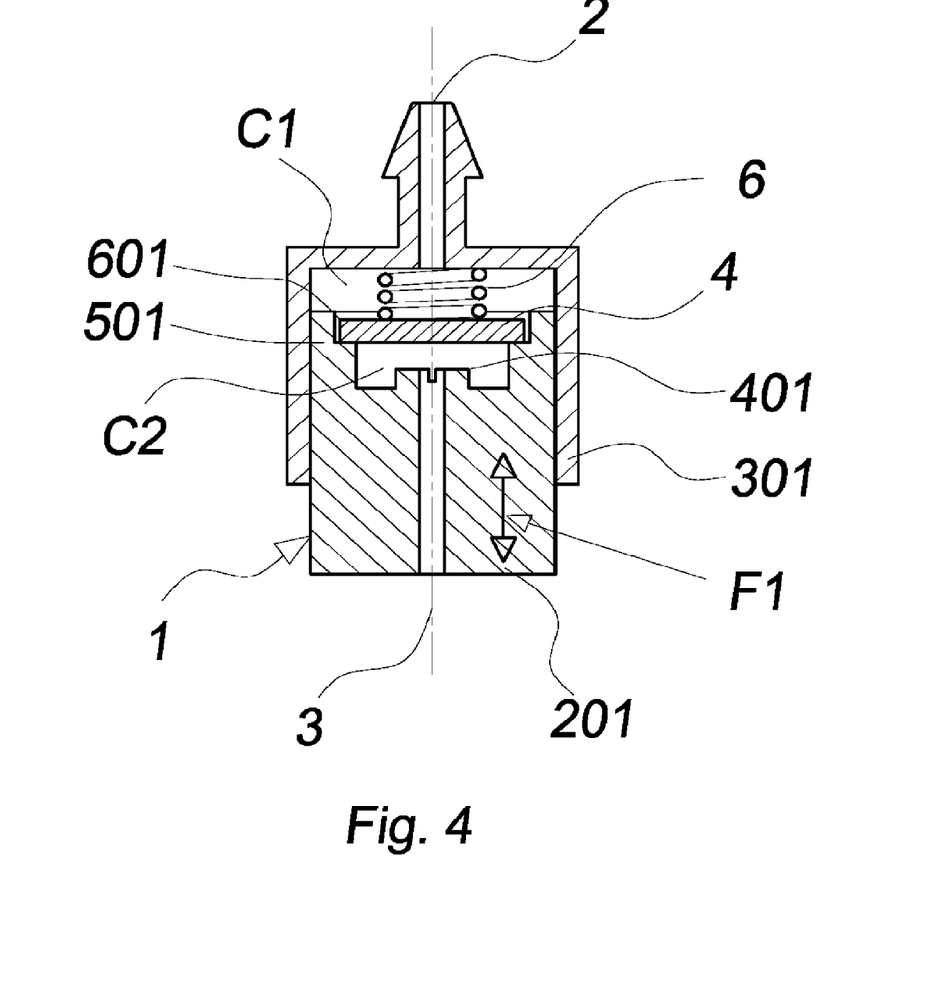
FIG. 4 is a variant embodiment, wherein the membrane is subjected to a previous deformation that can be adjusted by spring preloading means in combination with a movement of the bottom wall bearing the membrane with respect to the inlet port in this example the membrane being not preloaded.
Figure 7:
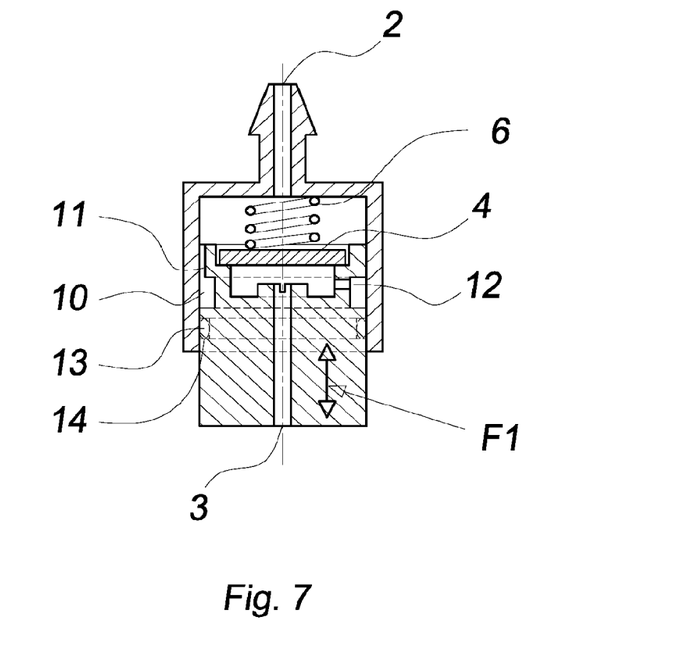
FIG. 7 is a variant embodiment of the example according to FIGS. 4 to 6, which variant provides the provision of means for reducing the pressure in the form of an intricate duct or a labyrinth interposed between the two chambers of the emitter in the communication duct.

With reference to FIG. 7, the emitter shown in this figure is the one of FIGS. 4 to 6 so like structural parts use like reference numbers. The emitter of FIG. 7 is different from the one of FIGS. 4 to 6 in that along the perimetric shell wall of the cylindrical body 201 closing the open side of the cup-like member being tightly inserted in the cylindrical perimetric wall 301 of such cup-like member there is provided a groove 10 opened towards said shell wall 301 of the cup-like member and making a labyrinth or intricate duct one of the end thereof leading in the chamber C1 by an axial duct 11 and the other end thereof leading in the chamber C2 by a terminal duct 12. Ducts 11, 12 and the groove 10 together make the communication duct between the two chambers and at the same time they are a means for reducing the pressure. The groove 10 can be an annular one, or it can extend less than a round angle or it can extend for various coils having a helicoidal shape (not shown).

By way of example, in FIG. 7 there is also shown the seal 13 between the cup-like member and the cylindrical body, and in this example it is housed in a corresponding annular outer groove 14 of the cylindrical body and is interposed between the groove and the inner surface of the shell wall 301 of the cup-like member.

Figure 8:
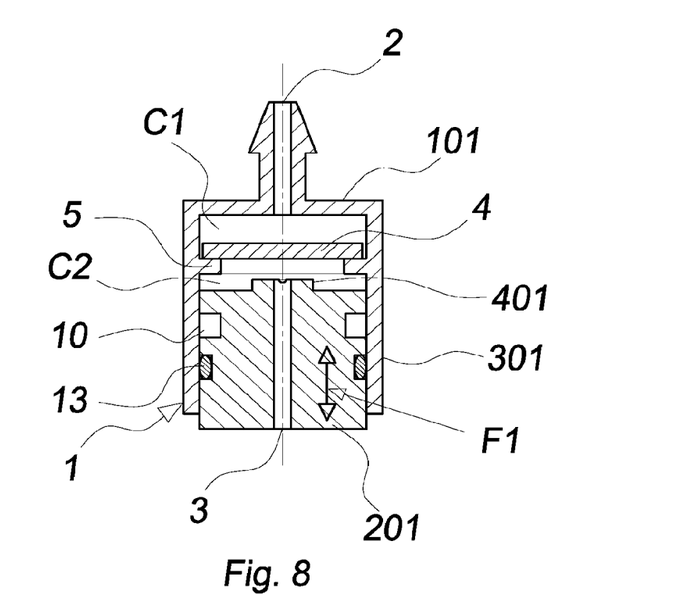
FIG. 8 is the variant of FIG. 7 applied to the embodiment of FIGS. 1 to 3.

The example of FIG. 8 show the application of variants provided in FIG. 7 to the embodiment of FIGS. 1 to 3 in combination with the embodiments of FIGS. 4 to 6.

Figure 9:
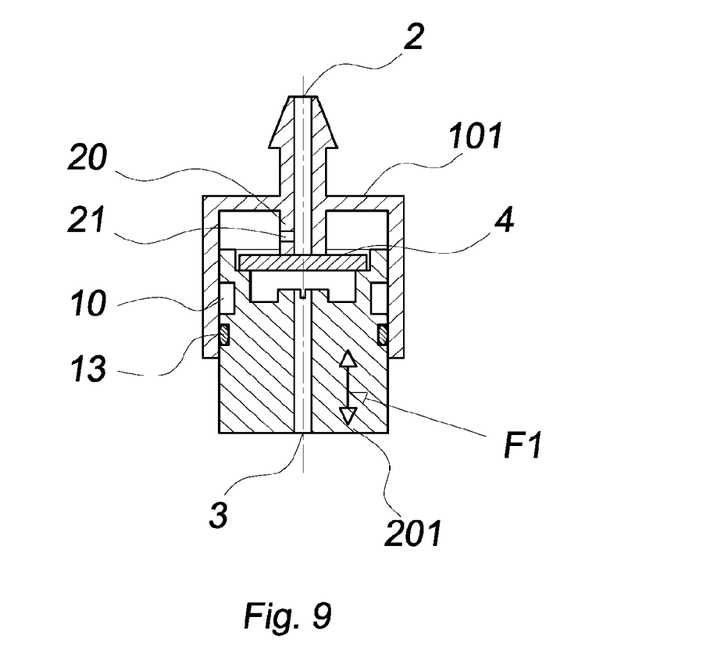
FIGS. 9 and 10 are a third variant embodiment of the device according to the present invention, wherein rigid pressing or supporting means act on the side of the fluid inlet chamber instead of an elastic member against the membrane.
Figure 10:
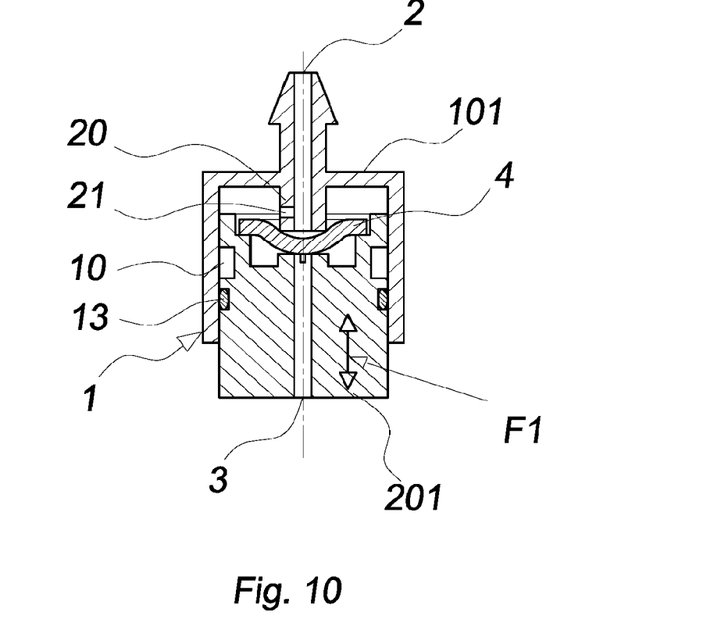

With reference to FIGS. 9 and 10, there is shown a further variant embodiment that is different from the preceding variants in that it provides means cooperating with the membrane, which are stationary means pressing thereon when the two casing parts are brought one closer the other for more than a certain extent, so that the membrane gets closer to the inlet of the chamber C1 for more than a certain minimum extent.

In the examples of FIGS. 9 and 10, like reference numbers are used for like structural parts or parts having the same function.

In the chamber C1, the inlet 2 extends towards the membrane 4 with an extension spout 20 extending for a certain length. In an intermediate relative position condition between the two casing parts of the emitter, that is, with the membrane in an intermediate position spaced from the inlet 3 (FIG. 9) the extension spout 20 abuts against the membrane 4, so the axial outlet port of said spout becomes closed. In such condition a radial or side port 21 provided in the shell perimetric wall of the extension spout 20 guarantees the supply of the fluid in the chamber C1. With the membrane 4 moving closer to the inlet 3, the extension spout 20 acts as a member deforming the membrane 4 (FIG. 10), so the latter becomes bent toward the outlet 3. By moving the membrane farther away with respect to the position of FIG. 1, the membrane 4 moves farther away from the extension spout 20, opening the axial supply duct and so increasing the supply flow in the chamber C1.

As it can be seen from FIGS. 9 and 10, even in such embodiment there can be provided a pressure reducing device such as in the exemplary embodiments of FIGS. 7 and 8.

What invention claimed is:

1. An adjustable fluid emitter for an irrigation system, the emitter comprising:
    a casing having an upper wall and a lateral wall
    a body disposed at least partly within the casing, a longitudinal position of the body within the casing being adjustable, a volume being defined between the upper wall of the casing and the body;
    a membrane that is elastically deformable, the membrane dividing the volume into a first chamber and a second chamber;
    an inlet port connecting the volume to a fluid supplying source, the inlet port fluidly communicating with said first chamber;
    an outlet port fluidly communicating with said second chamber through said body;
    said first chamber and said second chamber being in fluid communication one with the other through a communicating duct external to said membrane; and
    a support member defined in the casing or the body and retaining in a fixed position an outer edge of said membrane dividing the first chamber from the second chamber, such that only one of the casing or the body contacts the outer edge of the membrane, said member allowing said membrane to be elastically deformed when said membrane is subjected to a fluid pressure difference between said first chamber and said second chamber,
    wherein said membrane is deformable such that at least a portion of the membrane changes position with respect to said outlet port, thereby modifying a flow rate of a fluid through said outlet port depending on the fluid pressure difference,
    wherein a deformation of the membrane causes the membrane to become closer or more distanced from the outlet port, controlling and maintaining constant the flow rate of the fluid through said outlet port despite variations in a fluid pressure at least at the inlet or outlet ports, and
    wherein a longitudinal adjustment of the body mechanically changes a position of the membrane with respect to the outlet port.

2. The emitter according to claim 1, wherein said longitudinal adjustment of the body modifies said position of the membrane with respect to the outlet port when the membrane is urged or not urged to an idle or operating condition.

3. The emitter according to claim 1, wherein a flow rate through said outlet port is reduced when the membrane is deformed and moves closer to the outlet port, and wherein the flow rate through said outlet port increases when the membrane is deformed and moves farther away from said outlet port, thereby causing the flow rate of the fluid through said outlet port to be controlled and kept constant by said membrane despite the fluid pressure variations at least at the inlet or outlet ports.

4. The emitter according to claim 1,
    wherein the support member comprises an intermediate flange extending inwardly from the lateral wall of the casing.

5. The emitter according to claim 4,
    wherein the casing has a substantially cylindrical shape, and
    wherein the flange is provided perimetrically in the lateral wall of the casing.

6. The emitter according to claim 1, wherein the casing has a cylindrical shape and the upper wall of the casing is circular and comprises the inlet port.

7. The emitter according to claim 1, wherein the communicating duct is provided in one or more of the support member or in the lateral wall of the casing.

8. The emitter according to claim 7, wherein the communicating duct is configured with a cross-section that does not change in relation to fluid supplying or delivering conditions.

9. The emitter according to claim 1, wherein the support member is defined in the body, further comprising a spring member entirely disposed between the upper wall and the membrane, the spring member being adjustably loadable to provide a variable deformation of the membrane even when there is no pressure difference between the first and the second chambers.

10. The emitter according to claim 9, further comprising means for mechanically loading the spring member.

11. The emitter according to claim 10, wherein the means for mechanically loading comprise means compressing the spring member between the membrane and the upper wall.

12. The emitter according to claim 10, wherein the spring member is adjustably loadable by longitudinally adjusting the body, the membrane being in a fixed position with respect to the outlet port.

13. The emitter according to claim 9, wherein the support member is a step defined in a cavity in an upper portion of the body.

14. The emitter according to claim 9, wherein the spring member comprises a coil spring.

15. The emitter according to claim 1, wherein the support member is continuous, discontinuous, or provided with passageways or the communicating duct for the fluid, and wherein an inner portion of the membrane freely extends therebetween.

16. The emitter according to claim 1, wherein the emitter is configured to preset a distance of the membrane from the outlet port by bringing said outlet port closer to or farther away from the membrane, and by causing a deformation of the membrane by mechanical pre-loading, thereby causing a greater or lower deformation of the membrane and causing the membrane to operate within a restricted adjustment range.

17. The emitter according to claim 16, wherein the emitter is configured to generate said deformation of the membrane caused by the mechanical preloading in an idle or operating condition of the membrane.

18. The emitter according to claim 16, wherein the emitter is configured to adjust the position of the membrane with respect to the outlet regardless of whether the fluid pressure difference is positive, negative, or null.

19. The emitter according to claim 1, wherein the emitter is a drip emitter.

20. The emitter according to claim 1, further comprising a supplying duct and a plurality of emitters connected to said supplying duct at different sites.

21. The emitter according claim 1, further comprising a duct defined between the first and the second chambers for reducing pressure simultaneously and independently of the membrane.

22. The emitter according to claim 1, wherein the duct is provided along a perimetric portion of one of the lateral wall or the body and comprises a perimetric groove extending for an angle smaller than 360°, an annular groove, or a helicoidal groove shaped with one or more coils, and wherein one end of the duct is fluidly coupled to the first chamber and another end of the duct is fluidly coupled to the second chamber.

23. The emitter according to claim 22, wherein the duct comprises an annular or helicoidal perimetric groove provided on an outer side of the lateral wall overlapped by a perimetric wall of the body.

24. The emitter according to claim 1,
further comprising one or more rigid members deforming the membrane, the one or more rigid members being provided at a predetermined distance from the membrane,
wherein the membrane resting against said one or more rigid members in an idle condition without deformation by the one or more rigid members, and
wherein the membrane is deformable by the one or more rigid members in a direction toward the inlet port and further is deformable away from the one or more rigid members in a direction toward the outlet port.

25. The emitter according to claim 24, wherein the one or more rigid members comprise a spout extending the inlet port toward the membrane, wherein the spout projects for a predetermined length toward said membrane and wherein the spout has an inner supply duct extending longitudinally and further has a radial or side port fluidly connected to the inner supply duct.

* * * * *